(12) United States Patent
Verleene et al.

(10) Patent No.: US 10,371,308 B2
(45) Date of Patent: Aug. 6, 2019

(54) THREADED TUBULAR ELEMENT PROVIDED WITH A METALLIC ANTI-GALLING COATING AND A LUBRICANT LAYER

(71) Applicants: VALLOUREC OIL AND GAS FRANCE, Aulnoye-Aymeries (FR); NIPPON STEEL CORPORATION, Chiyoda-ku (JP)

(72) Inventors: Arnaud Verleene, Saint-Saulve (FR); Nicolas Baudin, Valenciennes (FR); Cedric Vogt, Lille (FR); Adil Jaafar, Aulnoye-Aymeries (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/565,299

(22) PCT Filed: Apr. 21, 2016

(86) PCT No.: PCT/EP2016/058848
§ 371 (c)(1),
(2) Date: Oct. 9, 2017

(87) PCT Pub. No.: WO2016/170032
PCT Pub. Date: Oct. 27, 2016

(65) Prior Publication Data
US 2018/0313491 A1 Nov. 1, 2018

(30) Foreign Application Priority Data
Apr. 23, 2015 (FR) ..................... 15 53662

(51) Int. Cl.
*F16L 58/18* (2006.01)
*C10M 171/00* (2006.01)
(Continued)

(52) U.S. Cl.
CPC ......... *F16L 58/182* (2013.01); *C10M 107/04* (2013.01); *C10M 107/28* (2013.01);
(Continued)

(58) Field of Classification Search
CPC .. F16L 58/182; C10M 171/00; C10M 107/04; C10M 107/28; C10M 107/30;
(Continued)

(56) References Cited

U.S. PATENT DOCUMENTS

2004/0195825 A1  10/2004  Anraku et al.
2007/0196632 A1   8/2007  Meyer, Jr. et al.
2010/0059986 A1   3/2010  Kimoto et al.

FOREIGN PATENT DOCUMENTS

EP  1 411 288 A1   4/2004
EP  2 128 506 A1  12/2009
(Continued)

OTHER PUBLICATIONS

International Search Report dated Jul. 14, 2016 in PCT/EP2016/058848 filed Apr. 21, 2016.

*Primary Examiner* — Michael C Miggins
(74) *Attorney, Agent, or Firm* — Oblon, McClelland, Maier & Neustadt, L.L.P.

(57) ABSTRACT

The invention concerns a threaded portion of a tubular element for a threaded tubular connection having an axis of revolution, the portion comprising a threading extending over its outer or inner peripheral surface, and a first sealing surface on the peripheral surface, the first sealing surface being capable of producing metal-metal interference with a corresponding second sealing surface belonging to a (Continued)

complementary threaded portion. The threading and the first sealing surface are coated with a metallic anti-galling layer wherein zinc (Zn) is the major element by weight, the metallic anti-galling layer being at least partially coated with a lubricant layer comprising a resin and a dry solid lubricant powder dispersed in the resin.

14 Claims, 4 Drawing Sheets

(51) Int. Cl.
*C10M 107/04* (2006.01)
*C10M 107/28* (2006.01)
*C10M 107/30* (2006.01)
*C10M 107/44* (2006.01)
*C10M 125/02* (2006.01)
*C10M 125/22* (2006.01)
*C10M 129/40* (2006.01)
*C10M 145/14* (2006.01)
*C10M 159/06* (2006.01)

(52) U.S. Cl.
CPC ........ *C10M 107/30* (2013.01); *C10M 107/44* (2013.01); *C10M 125/02* (2013.01); *C10M 125/22* (2013.01); *C10M 129/40* (2013.01); *C10M 145/14* (2013.01); *C10M 159/06* (2013.01); *C10M 171/00* (2013.01); *C10M 2201/041* (2013.01); *C10M 2201/042* (2013.01); *C10M 2201/053* (2013.01); *C10M 2201/062* (2013.01); *C10M 2201/066* (2013.01); *C10M 2201/105* (2013.01); *C10M 2205/022* (2013.01); *C10M 2205/0225* (2013.01); *C10M 2205/18* (2013.01); *C10M 2207/126* (2013.01); *C10M 2209/084* (2013.01); *C10M 2209/0845* (2013.01); *C10M 2209/1003* (2013.01); *C10M 2209/103* (2013.01); *C10M 2213/062* (2013.01); *C10M 2217/0443* (2013.01); *C10M 2217/0453* (2013.01); *C10M 2219/044* (2013.01); *C10M 2219/068* (2013.01); *C10N 2210/01* (2013.01); *C10N 2210/02* (2013.01); *C10N 2210/06* (2013.01); *C10N 2210/08* (2013.01); *C10N 2240/22* (2013.01); *C10N 2250/08* (2013.01); *C10N 2250/12* (2013.01); *C10N 2250/14* (2013.01); *C10N 2270/00* (2013.01); *C10N 2280/00* (2013.01)

(58) Field of Classification Search
CPC ......... C10M 107/44; C10M 125/02; C10M 129/40; C10M 145/14; C10M 159/06; C10M 2201/041; C10M 2201/042; C10M 2201/053; C10M 2201/062; C10M 2201/066; C10M 2201/105; C10M 2205/0225; C10M 2205/18; C10M 2207/126; C10M 2209/0845; C10M 2209/1003; C10M 2213/062; C10M 2217/0443; C10M 2217/0453; C10M 2219/044; C10M 2219/068; C10M 2205/022; C10M 2209/084; C10M 2209/103; C10N 2210/01; C10N 2210/02; C10N 2210/06; C10N 2210/08; C10N 2240/22; C10N 2250/08; C10N 2250/12; C10N 2250/14; C10N 2270/00; C10N 2280/00
See application file for complete search history.

(56) References Cited

FOREIGN PATENT DOCUMENTS

| | | |
|---|---|---|
| SU | 896 304 B | 1/1982 |
| WO | 2006/075774 A1 | 7/2006 |

THREADED TUBULAR ELEMENT PROVIDED WITH A METALLIC ANTI-GALLING COATING AND A LUBRICANT LAYER

FIELD OF THE INVENTION

The present invention relates to a tubular element for drilling and/or operating a hydrocarbon well, and more precisely to the threaded end of an element of this type. This end may be male or female in type, and is capable of being connected to a corresponding end of an analogous element in order to form a joint or connection.

The invention also relates to a threaded connection resulting from connecting two tubular elements by makeup, one of which may be a coupling with two female ends.

The term "tubular element for drilling and operating a hydrocarbon well" means any element with a substantially tubular shape which can be connected to another element which may or may not be of the same type, with a particular view of constituting either a hydrocarbon well drill string or a work-over riser or operating this kind of string such as a riser, or a casing or tubing string used in operating a well. The invention is also applicable to the elements used in a drill string such as, for example, drill pipes, heavy weight drill pipes, drill collars and tool joints.

Each tubular element comprises an end portion with a male threaded zone or a female threaded zone which is intended to be made up with a corresponding end portion of an analogous element. When connected, the elements compose what is known as a joint or connection.

These threaded tubular components of a connection are connected under pre-defined loads in order to respond to the clamping and seal demands imposed by the conditions of use; more precisely, a pre-defined torque is aimed for. Further, it should be known that the threaded tubular components may have to undergo several cycles of makeup and breakout, in particular in service.

The conditions for use of these threaded tubular components give rise to different types of loads. They have been reduced, inter alia, by using films or greases on the sensitive parts of these components such as the threaded zones, the abutment zones or indeed the metal/metal sealing surfaces.

Induced constraints in particular include constraints due to being kept in storage, necessitating the application of storage greases (different from makeup greases applied before being put into service). However, other solutions exist, consisting of using organic coatings.

Thus, makeup operations are usually carried out under a high axial load, for example because of the weight of a tube several meters long to be connected via the threaded connection, possibly aggravated by a slight misalignment of the axis of the threaded elements to be connected. This induces risks of galling in the threaded zones and/or in the metal/metal sealing surfaces. Thus, the threaded zones as well as the metal/metal sealing surfaces are routinely coated with lubricants.

Furthermore, the threaded tubular components are often stored then made up in an aggressive environment. This is the case, for example, in an "offshore" situation in the presence of a saline mist, or in an "onshore" situation in the presence of sand, dust and/or other pollutants. Thus, it is necessary to employ different types of coating against corrosion on the surfaces which are loaded during makeup, which is the case with the threaded zones or indeed in zones in clamping contact, which is the case with the metal/metal sealing surfaces and the abutments.

However, having regard to environmental standards, it appears that using greases complying with the standard API RP 5A3 (American Petroleum Institute) does not constitute a long-term solution, since such greases are caused to be extruded from the tubular components and released into the environment or into the well, causing blockages which necessitate special cleaning operations In order to respond to the problems of a long-lasting resistance to corrosion, galling and to prerogatives associated with environmental considerations, an alternative to greases has been developed. They not only provide a response to corrosion resistance performance and galling performance, but also to the industrial constraints involved in fabricating threaded ends.

Since 1969, WHITFORD (registered trade mark) has proposed high performance coatings produced from a mixture of polyamide-imide resin and fluoropolymers for threaded fasteners, which necessitate adapting the friction in rapid makeup/breakout operations.

Furthermore, since 2002, in the context of threaded connections, coatings based on polyamide-imide resin have been proposed to lubricate and guarantee the resistance to galling during makeup, as described in documents EP 1 378 698 and EP 1 959 179.

That prior art principally proposes obtaining dry films from a polyamide-amic acid precursor dissolved in a polar solvent or in an ethanol/toluene mixture. The dry film is generally applied in order to ensure lubrication as a function of the contact pressures in the threading. The proportion of fillers is relatively high, with a pigment/binder weight ratio in the range 0.25 to 4, preferably more than 3. The dry film is thus advantageously sacrificial and sufficiently resistant to wear during functioning of the solid lubricant.

Application WO 2004/033951 concerns a threaded metallic tube for the oil extraction industry with a threaded end portion the surface of which is treated and in which the metallic surface has a surface roughness (Ra) in the range 2.0 μm to 6 μm, this surface being covered with a uniform layer of a dry anti-corrosion coating and with a second, uniform layer of a dry lubricant coating. Alternatively, the two layers may be combined into a single layer of a dry anti-corrosion coating comprising a dispersion of particles of dry lubricant. Nevertheless, the dispersion of particles over the anti-corrosive layer deposited on the substrate introduces a certain amount of heterogeneity.

In addition, the application EP 2 128 506 concerns a threaded connection of the male/female type for steel tubes having a contact surface comprising a threaded portion and a non-threaded metal-on-metal contact portion. The surface of at least one of the male or female elements is coated with a first laminating layer produced from a Cu—Zn alloy or a Cu—Zn-M1 alloy (where M1 is at least one element selected from Sn, Bi and In). In spite of the interesting results with these layers containing copper, the anti-corrosive properties associated with them have been shown to have limits which it would be desirable to overcome.

Thus, the corrosion and galling behaviour of those disclosures could be improved by proposing, in addition to the functional properties of corrosion performance and good galling resistance, and a seal to gas and to liquid for the connections of the invention disclosed below. Based on this concept, the present invention proposes coating a threaded element or a connection formed by connecting threaded elements intended for drilling and/or operating hydrocarbon wells.

DISCLOSURE OF THE INVENTION

In a first aspect, the invention pertains to a threaded portion of a tubular element for a threaded tubular connection for drilling or operating hydrocarbon wells, having an axis of revolution, said portion comprising a threading extending over its outer or inner peripheral surface, and a first sealing surface on said peripheral surface, said first sealing surface being capable of producing metal-metal interference with a corresponding second sealing surface belonging to a complementary threaded portion of a tube, characterized in that said threading and said first sealing surface are coated with a metallic anti-corrosion and anti-galling layer wherein zinc (Zn) is the major element by weight.

Preferably, the metallic anti-corrosion and anti-galling layer is deposited electrolytically.

Preferably, the metallic anti-corrosion and anti-galling layer contains at least 50% by weight of zinc (Zn).

Preferably, the metallic anti-corrosion and anti-galling layer has a thickness in the range 4 μm to 20 μm.

Preferably, the metallic anti-corrosion and anti-galling layer comprises a substance selected from the group constituted by pure zinc (Zn) and a binary alloy of zinc (Zn) of the type Zn—X, in which X is selected from nickel (Ni), iron (Fe), magnesium (Mg) and manganese (Mn). Preferably, the metallic anti-corrosion and anti-galling layer is a zinc-nickel (Zn—Ni) alloy wherein the nickel (Ni) content is in the range 12-15% by weight and wherein the microstructure is monophase and in the gamma (γ) phase.

Preferably, the metallic anti-corrosion and anti-galling layer is coated with a lubricant layer comprising a resin and a dry solid lubricant powder dispersed in said resin.

Preferably, the metallic anti-corrosion and anti-galling layer is coated with a passivation layer comprising trivalent chromium (Cr(III)), said passivation layer being formed between the metallic layer and the lubricant layer.

Preferably, the metallic anti-corrosion and anti-galling layer is coated with a passivation layer comprising trivalent chromium (Cr(III)).

Preferably, the passivation layer is coated with a barrier layer constituted by a mineral matrix layer comprising particles of silicon dioxide ($SiO_2$).

Preferably, the passivation layer is coated with a barrier layer constituted by an organo-mineral matrix layer comprising particles of silicon dioxide ($SiO_2$).

Preferably, the portion further comprises a first abutment which is capable of coming into contact, at the end of makeup, with a corresponding second abutment and belonging to a complementary threaded tube portion.

Preferably, the threaded portion is produced from steel.

In an alternative, the threaded portion is male in type, with a threading extending over its outer peripheral surface as well as a first sealing surface on said outer peripheral surface.

In another alternative, the threaded portion is female in type, with a threading extending over its inner peripheral surface as well as a first sealing surface on said inner peripheral surface.

In a second aspect, the invention pertains to a threaded portion of a tubular element for a threaded tubular connection for drilling or operating hydrocarbon wells, having an axis of revolution, said portion comprising a threading extending over its outer or inner peripheral surface, and a first sealing surface on said peripheral surface, said first sealing surface being capable of producing metal-metal interference with a corresponding second sealing surface belonging to a complementary threaded portion, characterized in that said threading and said first sealing surface are coated with a metallic anti-galling layer wherein zinc (Zn) is the major element by weight, said metallic anti-galling layer being at least partially coated with a lubricant layer comprising a resin and a dry solid lubricant powder dispersed in said resin.

In a preferred manner, the metallic anti-galling layer in this threaded portion is deposited electrolytically.

In a preferred manner, the metallic anti-galling layer contains at least 50% by weight of zinc (Zn).

In a preferred manner, the metallic anti-galling layer has a thickness in the range 4 μm to 20 μm.

In a preferred manner, the lubricant layer has a thickness in the range 5 μm to 50 μm.

In a preferred manner, the metallic anti-galling layer comprises a substance selected from the group constituted by pure zinc (Zn) and a binary alloy of zinc (Zn) of the type Zn—X, in which X is selected from nickel (Ni), iron (Fe), magnesium (Mg) and manganese (Mn). In a preferred manner, the metallic anti-galling layer is a binary zinc-nickel (Zn—Ni) alloy wherein the nickel (Ni) content is in the range 12-15% by weight and wherein the microstructure is monophase and in the gamma (γ) phase.

In a preferred manner, the threaded portion of the invention comprises a passivation layer comprising trivalent chromium (Cr(III)), said passivation layer being formed between the metallic anti-galling layer and the lubricant layer.

In a preferred manner, the dry solid lubricant powder is selected from the group constituted by polytetrafluoroethylenes (PTFE), molybdenum dithiocarbamates (MoDTC), molybdenum disulphides ($MoS_2$), carbon blacks (C), graphite fluorides ($CF_x$) or a mixture thereof.

In a preferred manner, the resin is selected from the group constituted by polyvinyl resins, epoxy resins, acrylic resins, polyurethane resins and polyamide-imide resins.

In a preferred manner, the resin is of the acrylic type and the dry solid lubricant powder contains 3% to 15% of carbon blacks, $MoS_2$ or molybdenum dithiocarbamates (MoDTC), alone or in combination.

In a preferred manner, the threaded portion of the invention further comprises a first abutment which is capable of coming into contact, at the end of makeup, with a corresponding second abutment belonging to a complementary threaded portion.

In a preferred manner, the threaded portion is produced from steel.

In one case, the threaded portion is male in type, with a threading extending over its outer peripheral surface, as well as a first sealing surface on said outer peripheral surface.

In another case, the threaded portion of the invention is female in type, with a threading extending over its inner peripheral surface as well as a first sealing surface on said inner peripheral surface.

In a third aspect, the invention pertains to a threaded tubular connection for drilling or operating hydrocarbon wells, comprising a portion of a tubular element with a male end having an axis of revolution and provided with a first threading extending about the axis of revolution, said male end portion being complementary with a portion of a tubular element with a female end having an axis of revolution and provided with a second threading extending about the axis of revolution, said male and female end portions being capable of being connected by makeup, each of the male and female end portions further comprising a sealing surface with a metal-metal interference, characterized in that the threading and the sealing surface of one of the two, male or female, end portions are coated with a first metallic anti-corrosion and anti-galling layer wherein zinc (Zn) is the major element by weight, said first metallic anti-corrosion and anti-galling layer being coated with a first passivation layer, the threading and sealing surface of the male or female complementary portion being coated with a second metallic anti-galling layer wherein zinc (Zn) is the major element by weight, said second metallic anti-galling layer being at least partially coated with a lubricant layer comprising a resin and a dry solid lubricant powder dispersed in said resin.

Preferably, the threaded tubular connection of the invention is such that at least one of the first and second metallic layers is deposited electrolytically.

Preferably, the threaded tubular connection of the invention is such that at least one of the first and second metallic layers contains at least 50% by weight of zinc (Zn).

Preferably, the threaded tubular connection of the invention is such that at least one of the first and second metallic layers has a thickness in the range 4 μm to 20 μm.

Preferably, the lubricant layer has a thickness in the range 5 μm to 50 μm.

Preferably, the threaded tubular connection of the invention is such that at least one of the first and second metallic layers comprises a substance selected from the group constituted by pure zinc (Zn) and a binary alloy of zinc (Zn) of the type Zn—X, in which X is selected from nickel (Ni), iron (Fe), magnesium (Mg) and manganese (Mn). Preferably, the threaded tubular connection of the invention is such that at least one of the first and second metallic layers is a binary zinc-nickel (Zn—Ni) alloy wherein the nickel (Ni) content is in the range 12-15% by weight and wherein the microstructure is monophase and in the gamma (γ) phase.

Preferably, the first passivation layer comprises trivalent chromium (Cr(III)).

Preferably, the threaded tubular connection of the invention is such that a second passivation layer comprising trivalent chromium (Cr(III)) is formed between the second metallic anti-galling layer and the lubricant layer.

Preferably, the dry solid lubricant powder is selected from the group constituted by polytetrafluoroethylenes (PTFE), molybdenum disulphides ($MoS_2$), molybdenum dithiocarbamates (MoDTC), carbon blacks (C), graphite fluorides ($CF_x$) or a mixture thereof.

Preferably, the threaded tubular connection in accordance with the invention is such that the resin is selected from the group constituted by polyvinyl resins, epoxy resins, acrylic resins, polyurethane resins and polyamide-imide resins.

Preferably, the resin is of the acrylic type and the dry solid lubricant powder contains 3% to 15% of carbon blacks, $MoS_2$, or molybdenum dithiocarbamates (MoDTC), alone or in combination.

Preferably, the threaded tubular connection of the invention is such that at least one of the first and second passivation layers is coated with a barrier layer constituted by a mineral matrix layer comprising particles of silicon dioxide ($SiO_2$).

Preferably, the mineral matrix layer further comprises potassium oxide.

Preferably, the threaded tubular connection of the invention is such that at least one of the first and second passivation layers is coated with a barrier layer constituted by an organo-mineral matrix layer comprising particles of silicon dioxide ($SiO_2$).

Preferably, the threaded tubular connection of the invention is such that at least one of the first and second passivation layers is coated with a layer of dry lubricant.

Preferably, the male end portion in accordance with the invention further comprises a first abutment and the female end portion further comprises a second abutment, the first and second abutments being capable of coming into contact with each other at the end of makeup.

Preferably, the threaded tubular connection in accordance with the invention is such that the male and female end portions are produced from steel.

EMBODIMENTS

The invention will be better understood from the following description which provides non-limiting explanations. It should be noted that the substrate onto which the various layers in accordance with the invention are deposited is preferably formed from steel and that the invention may equally be performed on a male as on a female end.

The threaded portion of the invention systematically comprises a threading which extends over its outer or inner peripheral surface depending on whether the threaded portion is respectively male or female, and a first sealing surface on said peripheral surface, said first sealing surface being capable of producing metal-metal interference with a corresponding second sealing surface belonging to a complementary threaded portion. The sealing surface is important in the threaded portion in accordance with the invention because, when coated in accordance with the invention, it provides a seal to gas and to liquid with the metal/metal contact. Preferably, the metal/metal contact is produced with an interference.

In the description below, the layers are deposited on at least the threading of the threaded portion in accordance with the invention and on the sealing surface.

In accordance with the invention, a metallic layer wherein zinc (Zn) is the major element by weight will be deposited on the substrate of the tubular threaded portion, preferably formed from steel. The metallic layer in accordance with the invention is ideally deposited electrolytically. The principle of this type of deposit is summarized below. Apart from its mechanical strength, the major advantage of the metallic layer is its microstructural uniformity. It should be understood here that "microstructural uniformity" does not necessarily imply a monophase crystalline structure; in contrast, the reverse is true.

In the context of the invention, the term "metallic layer" means a layer constituted by metal. Clearly, impurities may be present, but preferably, the layer is exclusively metallic. The exclusively metallic layer of the invention has the advantage of having a microstructural uniformity. In fact, under the optical microscope with a magnification of ×500, the observed microstructure has a homogeneous appearance.

In fact, both the mechanical strength and the microstructural uniformity of the metallic layer are substantially greater than those of organic coatings which, furthermore, have poorer stability to temperature.

Deposition by electrolysis is a technique used here to reduce metallic ions or oxides into pure metals by applying an electric current density which may be from 1 amp/dm² to 100 amp/dm² in the context of the invention. The electrolytic bath is at a temperature in the range 18° C. to 50° C. Below 18° C., the efficiency of the bath is insufficient. Above 50° C., the chemical components (for example additives) of the bath will be degraded. As an example, a method for depositing a metallic coating known as buffer electrolysis may require very high currents at the high end of the range cited above.

The electrolytes are necessary in order to provide the electrical conductivity and may be aqueous solutions or molten salts. A metallic layer wherein zinc (Zn) is the major element by weight may be deposited electrolytically; this is the technique used in the invention. Other metals such as copper or even nickel may also be deposited electrolytically.

Electrolysis in an aqueous medium is carried out with a system of two electrodes composed of an anode and a cathode. Ion reduction occurs at the cathode and is defined as follows:
$M^{n+} + ne^- \leftrightarrow M$, where M represents a metal and n is a whole number.

In the case of electro-deposition, the cathode is the substrate onto which deposition occurs. In fact, ideally, this is a steel in the case of the invention.

At the anode, the reaction obtained is an oxidation of water to form gaseous dioxygen in accordance with the two equations below, depending on whether the medium is respectively acidic or alkaline:

$$2H_2O \rightarrow O_{2(g)} + 4H^+ + 4e^- \quad (1)$$

or $$6OH^- \rightarrow 3H_2O + \frac{3}{2}O_{2(g)} + 6e^-. \quad (2)$$

One of the principal difficulties with electrolysis in an aqueous medium is the competition that exists between reduction of the metallic ions and reduction of the solvent at the cathode, defined by the reaction:

$$2H_2O + 2e^- \rightarrow H_{2(g)} + 2OH^-. \quad (3)$$

In theory, the reactions which should take place are linked to the potentials of the electrodes which are themselves linked to each selected material, but experiments carried out in the context of the invention produced results which were difficult to predict. In fact, the kinetics of the reactions is complex.

The work *Modern Electroplating*, John Wiley & Sons, Inc. 5th edition, p. 285-307, section 10: *Electrodeposition of zinc and zinc alloys*, R. Winand, 2010 provides more details regarding the electrolytic deposition of zinc or an alloy of zinc onto substrates.

The deposition of a metallic layer wherein zinc (Zn) is the major element by weight in accordance with the invention onto the substrate, preferably steel, means that both the corrosion behaviour, the galling resistance and the mechanical strength of the assembly can be modified at the same time. The presence of a deposit of an alloy with an element other than zinc (Zn) as the major element, i.e. having the highest content by weight of the elements of the alloy, is not desirable because the corrosion behaviour performances are such that the desired effect is not obtained. The thickness of the metallic layer wherein zinc (Zn) is the major element by weight is preferably in the range 4 to 20 μm. Below 4 μm, the anti-corrosion effect is reduced because the layer runs the risk of exhibiting insufficient corrosion behaviour. Above 20 μm, there is a high risk of the accumulation of $H_2$ by combination of $H^+$ in accordance with equation (1). This accumulation is higher when the layer is thicker. There is then the danger that $H_2$ gas will be trapped in the structure, which will become more fragile due to the generation of internal stresses. Still more preferably, the thickness of the metallic layer is in the range 6 to 15 μm.

The metallic layer wherein zinc (Zn) is the major element by weight, deposited electrolytically, may be completed by additional treatments such as the formation of a passivation layer on the metallic layer. In a variation, it is also possible to deposit, over the whole of the metallic layer or over a portion thereof, a lubricant layer comprising a resin and a dry solid lubricant powder dispersed in this resin. In addition to its lubricating function, this layer may contribute to the anti-corrosion function. It is entirely possible in the context of the invention to deposit a lubricant layer of this type on the passivation layer. The lubricant layer has a thickness in the range 5 μm to 50 μm. Below 5 μm, the lubricating effect is not satisfactory. Above 50 μm, the maximum makeup torque may become too high. Furthermore, above 50 μm, there is the danger that chips originating from the damaged coating might be formed. Chips of this type might fall to the bottom of the oil well and consequently cause the operating conditions to deteriorate. Preferably, the lubricant layer has a thickness in the range 10 μm to 30 μm.

Other variations consist of depositing a barrier layer generally known as a sealer onto the formed passivation layer.

Another variation also consists of depositing a lubricant layer on the entire passivation layer which has been formed, or onto just a portion thereof.

It is also entirely possible to deposit a lubricant layer, with or without an anti-corrosion function, onto the metallic layer in its entirety or onto just a portion thereof without having formed a passivation layer.

The various layers in the various configurations of the invention are deposited by means of successive operations carried out on the preferably metallic substrate, or even more preferably onto steel. The following operations are carried out: chemical or electrochemical degreasing of the substrate using solvents and/or alkaline solutions, followed by rinsing. Next, chemical or electrochemical stripping of the surface of the substrate is carried out, preferably by immersing the substrate in an acidic solution in order to eliminate the surface oxides.

The surface may be activated using the following products: hydrochloric acid, sulphuric acid, phosphoric acid, nitric acid, hydrofluoric acid or a mixture of these acids.

In accordance with the invention, a metallic layer wherein zinc (Zn) is the major element by weight is deposited onto the threaded end portion comprising a threading and a first sealing surface. This means that the deposit of the metallic layer, ideally carried out by electrolysis, may be: zinc (Zn) alone or a binary alloy of zinc (Zn) of the type Zn—X, in which X is selected from nickel (Ni), iron (Fe), magnesium (Mg) and manganese (Mn).

Pure Zn will be used for its anti-corrosion and anti-galling characteristics. In accordance with the invention, a metallic layer wherein zinc (Zn) is the major element by weight is used because, compared with iron, in the context of a steel type substrate, zinc has a more negative standard potential. In other words, Zn offers effective cathodic protection against corrosion in this case.

In the context of a steel type substrate, using pure Zn is thus not problematic, but Zn—Ni is preferred because pure Zn is consumed (chemically eroded) at a higher rate. Thus, a particularly thick layer would be required, which is not advantageous on the threading and the sealing surface. In fact, a thick layer would result in a smaller clearance at the threads, which would impair optimization of the contact surfaces which would be preferred to be made, depending on the type of connection. Zn—Ni should be used, not just for its anti-corrosion characteristics, but also for its anti-galling characteristics.

Zn—Fe is also a sacrificial protection as regards the preferred steel type substrate. The layer of Zn—Fe is a good adhesion promoter. Zn—Fe produces a lower corrosion rate than pure Zn.

Zn—Mg is of interest, because this alloy slows down the rate of corrosion due to the presence of Mg in the case of a preferred substrate, i.e. steel.

In the context of a steel type substrate, Zn—Mn provides barrier protection. However, the barrier function is of advantage in terms of anti-corrosion resistance because it will not be attacked and will remain intact. Furthermore, it has very good corrosion behaviour when naturally exposed.

It will be recalled that electrolytic deposition can be used to improve the uniformity of the deposit from a microstructural viewpoint. Clearly, other manners of depositing a metallic coating exist, such as galvanization, spraying, or even sherardizing.

The alternative, consisting of forming a passivation layer on the metallic layer, means that the corrosion resistance can be further improved.

The alternative, consisting of depositing a lubricant layer comprising a resin and a dry solid lubricant powder dispersed in said resin over at least a part of the portion, means that the makeup torque of the connection can be better controlled and galling can be avoided.

The dry solid lubricant powder is preferably selected from the group constituted by polytetrafluoroethylenes (PTFE), molybdenum disulphides ($MoS_2$), carbon blacks (C), graphite fluorides ($CF_x$) or a mixture thereof.

PTFEs (polytetrafluoroethylenes) provide lubricating properties with a coefficient of friction which is stable with contact pressure. The makeup torque is thus better controlled. The mean particle size of the PTFE particles of the invention is less than 15 μm. Above 15 μm, the dispersion in the resin would be heterogeneous because the particles would be too thick compared with the total thickness of the lubricant layer.

The resin is selected from the group constituted by polyvinyl resins, epoxy resins, acrylic resins, polyurethane resins and polyamide-imide resins.

The polyvinyl resins, epoxy resins and acrylic resins adhere in a satisfactory manner to the metallic layer containing Zn or the passivation layer.

Polyurethane resins have the advantage of being particularly stable chemically and are easy to employ by curing.

Polyamide-imide resins are particularly resistant to wear.

In a preferred embodiment, the resin is acrylic in type and the dry solid lubricant powder dispersed in said resin contains 3% to 15% of carbon blacks, $MoS_2$, or molybdenum dithiocarbamates (MoDTC), alone or in combination. This combination exhibits a synergistic effect in terms of anti-galling, adhesion and control of the makeup torque.

The molybdenum disulphides ($MoS_2$), molybdenum dithiocarbamates (MoDTC), carbon blacks (C), graphite fluorides ($CF_x$) or a mixture thereof supply lubricating properties with a coefficient of friction which is stable with contact pressure.

The makeup torque is thus better controlled.

Derivatives of $MoS_2$ also have all of the lubricating properties cited above.

In a preferred embodiment, the deposited layers of metal containing Zn are a binary Zn—Ni alloy containing between 12% and 15% of Ni, the remainder clearly being Zn and inevitable impurities wherein the sum of the quantities is strictly less than 3% by weight. In fact, below 12% of Ni, the corrosion resistance is not optimized, while above 15% of nickel, the structure of the coating is no longer monophase but polyphase, and the phases present induce internal stresses and render the coating fragile.

Finally, the microstructure of this preferred metallic deposit of Zn—Ni with 12% to 15% of nickel is preferably of the monophase type and the phase which is present is gamma in type. This gamma type crystalline structure ensures better corrosion resistance.

Preferably, the passivation layer comprises trivalent chromium Cr(III). This trivalent chromium is more stable than Cr(II) and not harmful to health, unlike Cr(VI).

Preferably, the passivation layer, when it is present, is coated with a barrier layer constituted by a mineral matrix layer comprising particles of silicon dioxide ($SiO_2$). This barrier layer improves the anti-corrosion resistance.

An alternative consists of using a passivation layer coated with a barrier layer constituted by an organo-mineral matrix layer comprising particles of silicon dioxide ($SiO_2$). This barrier layer improves the anti-corrosion resistance.

One embodiment consists of depositing a lubricant layer onto the passivation layer in order to better control the makeup torque of the connection and to avoid galling.

The metal/metal contact of the threaded portions of the invention is made with an interference. The "interference" between the male and female elements of the invention corresponds to a diametrical interference between coupled points of the two surfaces of revolution. More particularly, this diametrical interference is defined by the difference in the diameter of the regular section of the surfaces at the coupled points of the two surfaces of revolution. This difference may be measured before assembling said elements, then may be evaluated at the contact surface when the two elements have been assembled with each other. In practice, it is a routine matter to ensure that one diameter of a portion of the outer peripheral surface of the male element is slightly greater than the diameter of a portion of the inner peripheral surface of the female element. This brings about an exchange of material in the contact zone of these surfaces. Thus, a high contact pressure is provided between said coupled points.

EXAMPLES

The non-limiting examples of threaded portions (either male or female or both) formed from steel described below were treated electrolytically with a binary zinc-nickel alloy. The binary zinc-nickel alloy used in the examples is available from ELECTROPOLI (registered trade mark) under the commercial name ZELTEC 2.4 (registered trade mark).

The parameters for the electrolytic treatment were as follows:
temperature of electrolytic bath: Temp.=36° C.;
pH of electrolytic bath: pH=5.4;
applied current density: J=2 A/dm$^2$;
dwell time in electrolytic bath: t=20 min.

Thus, the electrolytic treatment was carried out in an acidic medium.

This produced a metallic layer comprising zinc (Zn). The thickness of the metallic layer was in the range 4.0 µm to 12.5 µm (extreme values), typically 6 µm to approximately 8 µm. The nickel (Ni) content was generally in the range 12% to 15% (extreme values). It followed that the zinc (Zn) content was generally in the range 85% to 88% (extreme values). The metallic layer had both anti-galling and anti-corrosion properties.

When a barrier layer was present, it was in particular the product sold under the name FINIGARD 460 from COVENTYA (registered trade mark).

When a passivation layer was present, it was in particular the product sold under the name FINIDIP 128 CF (cobalt free) from COVENTYA (registered trade mark). It could also be the product sold under the name EcoTri (registered trade mark) NoCo from ATOTECH (registered trade mark) Deutschland GmbH. These two products have the particular advantage of being free of hexavalent chromium (Cr(VI)).

In the exemplary embodiments described below, each threaded portion is intended to form a portion of a threaded tubular connection. Each threaded portion has an axis of revolution and comprises a threading. The threading extends over the outer peripheral surface of the threaded portion when it is a male element; in contrast, the threading extends over the inner peripheral surface of the threaded portion when it is a female element. Each threaded portion also comprises a first sealing surface on the peripheral surface which is arranged to produce metal-metal interference with a corresponding second sealing surface belonging to a complementary threaded portion of a tube. A complementary threaded portion of a male portion is a female threaded portion. A complementary threaded portion of a female portion is a male threaded portion.

In the exemplary embodiments below, reference is systematically made to an assembly of two complementary threaded portions which can form a tubular connection when they are made up one into the other. It should be understood that the surface treatments, the layers and the finishing treatments may be applied irrespectively to a male threaded portion or to a female threaded portion. As a consequence, when an embodiment makes reference to a male portion comprising a certain particular first coating (ensemble of layers) and makes reference to a female portion comprising a certain particular second coating (other ensemble of layers), it should be understood that it is possible to reverse the particular first and second coatings of the threaded portions, i.e. apply the first particular coating to the female portion and apply the second particular coating to the male portion.

Example 1

Figure 1:
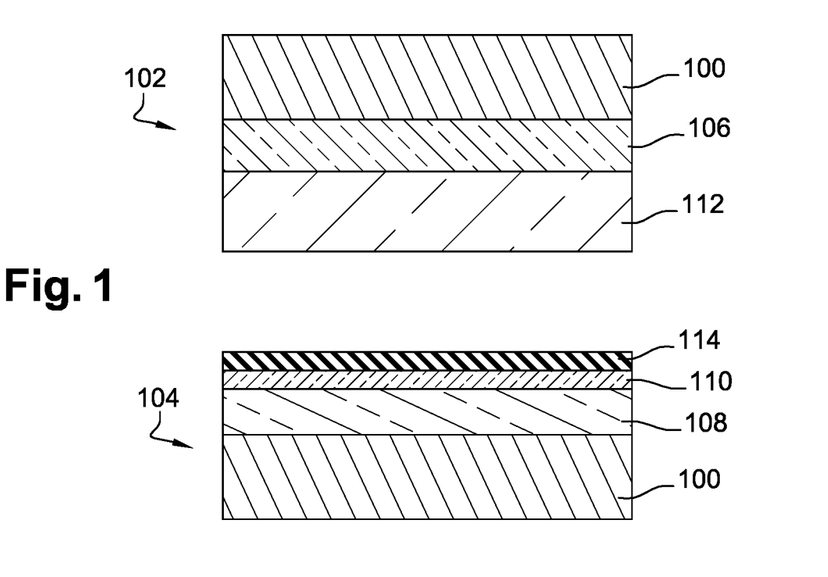
FIG. 1 represents a close-up view of a coated surface of a threaded tube end, in section along the longitudinal axis, in a first embodiment in accordance with the invention.

FIG. 1 shows a substrate 100 formed from steel. The substrate 100 is shaped so as to form a female threaded portion 102 and a male threaded portion 104.

The male threaded portion 104 is coated with a first anti-corrosion and anti-galling layer 108. The first metallic layer 108 is deposited electrolytically, as described above. The first metallic layer 108 is constituted by a binary zinc-nickel (Zn—Ni) alloy and contains zinc (Zn), namely in a mean amount of 85.7%. The first metallic layer 108 has a mean thickness of 8.3 µm. Furthermore, the first metallic layer has a monophase gamma type microstructure.

The first metallic layer 108 is coated with a passivation layer 110, as described above. By definition, the passivation layer has anti-corrosive properties.

Optionally, the passivation layer 110 is coated with a barrier layer 114 as described above, which also has anti-corrosive properties.

The female threaded portion 102 is coated with a second metallic anti-galling layer 106. The second metallic layer 106 is constituted by a binary Zn—Ni alloy.

The second metallic layer 106 is deposited electrolytically. The second metallic layer 106 contains mainly zinc (Zn) by weight. Furthermore, the second metallic layer has a monophase gamma type microstructure.

The second metallic layer 106 is coated with a lubricant layer 112. In the embodiment of FIG. 1, the lubricant layer 112 is of the hot-melt type, having both lubricating properties and anti-corrosive properties.

The hot-melt lubricant layer has the following composition by weight:
matrix: 70% to 95%
solid lubricant: 5% to 30%.
The matrix has the following composition:
homopolymeric polyethylene: 8% to 90%
carnauba wax: 5% to 30%
zinc stearate: 5% to 30%
calcium sulphonate derivative: 0 to 50%
alkyl polymethacrylate: 0 to 15%
colorant: 0 to 1%
antioxidant: 0 to 1%
Silicone (surfactant element): 0 to 2%

Example 2

Figure 2:
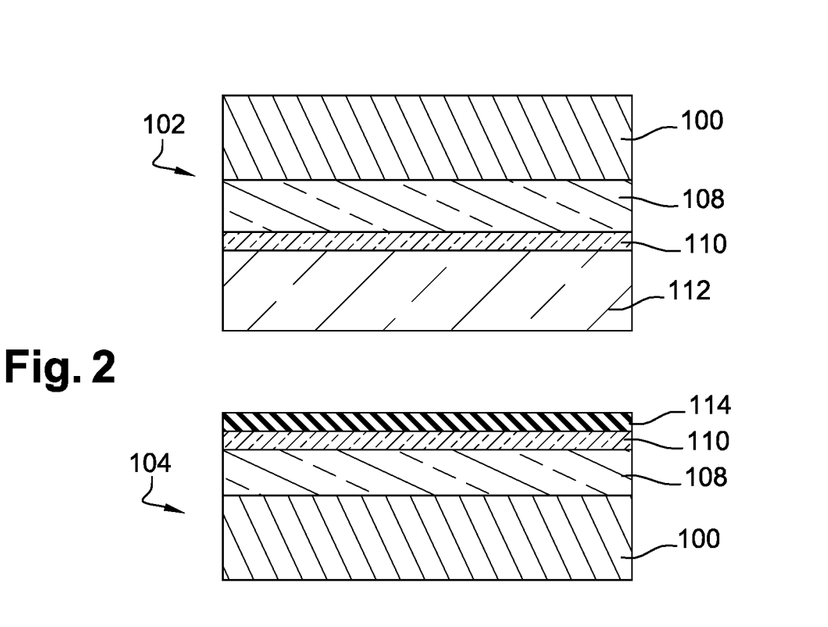
FIG. 2 represents a close-up view of a coated surface of a threaded tube end, in section along the longitudinal axis, in a second embodiment in accordance with the invention.

FIG. 2 shows a substrate 100 formed from steel. The substrate 100 is shaped so as to form a female threaded portion 102 and a male threaded portion 104.

The male threaded portion 104 is coated with a metallic anti-corrosion and anti-galling layer 108. The metallic layer 108 is deposited electrolytically, as described above. The metallic layer 108 is constituted by a binary zinc-nickel (Zn—Ni) alloy and contains zinc (Zn), namely a mean amount of 86.5%. The first metal layer 108 has a mean thickness of 6.7 µm.

The metallic layer 108 of the male threaded portion 104 is coated with a passivation layer 110, as described above. By definition, the passivation layer has anti-corrosive properties.

The passivation layer 110 of the male threaded portion 104 is coated with a barrier layer 114 as described above, which also has anti-corrosive properties.

The female threaded portion 102 is coated with a metallic anti-corrosion and anti-galling layer 108. The metallic layer 108 is deposited electrolytically, as described above. The metallic layer 108 is constituted by a binary zinc-nickel (Zn—Ni) alloy and contains zinc (Zn), namely a mean amount of 86.4%. The metallic layer 108 has a mean thickness of 7.4 µm.

The metallic layer 108 of the female threaded portion 102 is coated with a passivation layer 110, as described above. By definition, the passivation layer has anti-corrosive properties.

The passivation layer 110 of the female threaded portion 102 is coated with a lubricant layer 112. In the embodiment of FIG. 2, the lubricant layer 112 is of the hot-melt type having both lubricating properties and anti-corrosive properties.

Example 3

Figure 3:
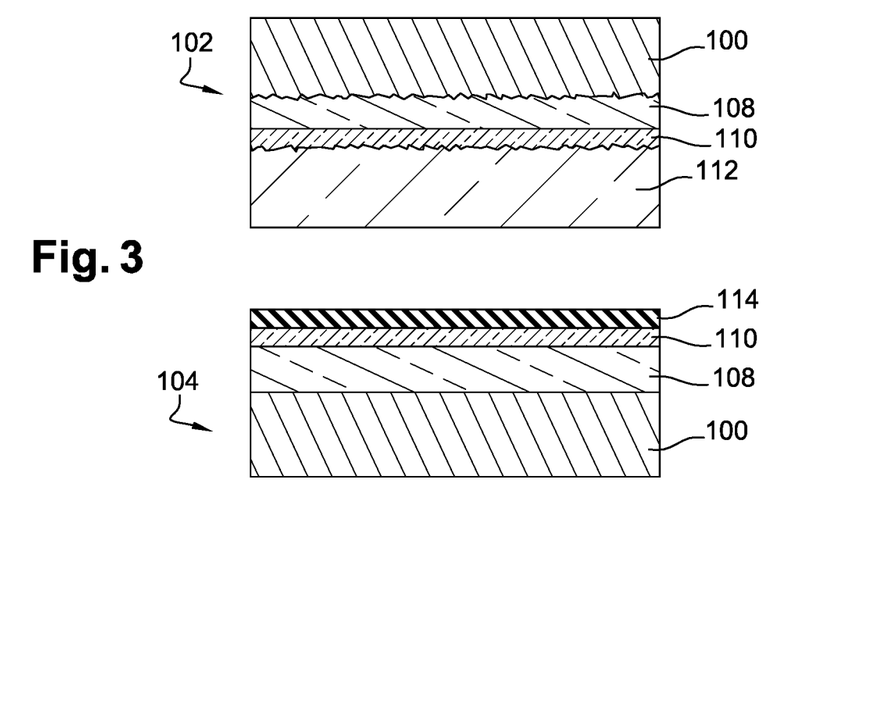
FIG. 3 represents a close-up view of a coated surface of a threaded tube end, in section along the longitudinal axis, in a third embodiment in accordance with the invention.

FIG. 3 shows a substrate 100 formed from steel. The substrate 100 is shaped so as to form a female threaded portion 102 and a male threaded portion 104.

The male threaded portion 104 is coated with a metallic anti-corrosion and anti-galling layer 108. The metallic layer 108 has been deposited electrolytically, as described above. The metallic layer 108 is constituted by a binary zinc-nickel (Zn—Ni) alloy and contains zinc (Zn), namely a mean amount of 86.5%. The first metallic layer 108 has a mean thickness of 7 μm.

The metallic layer 108 of the male threaded portion 104 is coated with a passivation layer 110, as described above. By definition, the passivation layer has anti-corrosive properties.

The passivation layer 110 of the male threaded portion 104 is coated with a barrier layer 114 as described above, which also has anti-corrosive properties.

The substrate 100 of the female threaded portion 102 has a surface roughness. The surface roughness has been obtained by a sand blasting process. A sand blasting process in particular enabled a surface roughness (Ra) in the range 1.0 μm to 10 μm to be produced. In the exemplary embodiment of FIG. 3, the surface roughness (Ra) is approximately 2 μm.

The female threaded portion 102 is coated with a metallic anti-corrosion and anti-galling layer 108. The metallic layer 108 has been deposited electrolytically, as described above. The metallic layer 108 is constituted by a binary zinc-nickel (Zn—Ni) alloy and contains zinc (Zn), namely a mean amount of 85.6%. The metallic layer 108 has a mean thickness of 7 μm.

The metallic layer 108 of the female threaded portion 102 is coated with a passivation layer 110, as described above. By definition, the passivation layer has anti-corrosive properties.

The passivation layer 110 of the female threaded portion 102 is coated with a lubricant layer 112. In the embodiment of FIG. 3, the lubricant layer 112 comprises a resin and a dry solid lubricant dispersed in this resin. In this case, the lubricant layer 112 is constituted by a polyurethane resin (type PU2K) in which particles of carbon black have been dispersed.

Example 4

Figure 4:
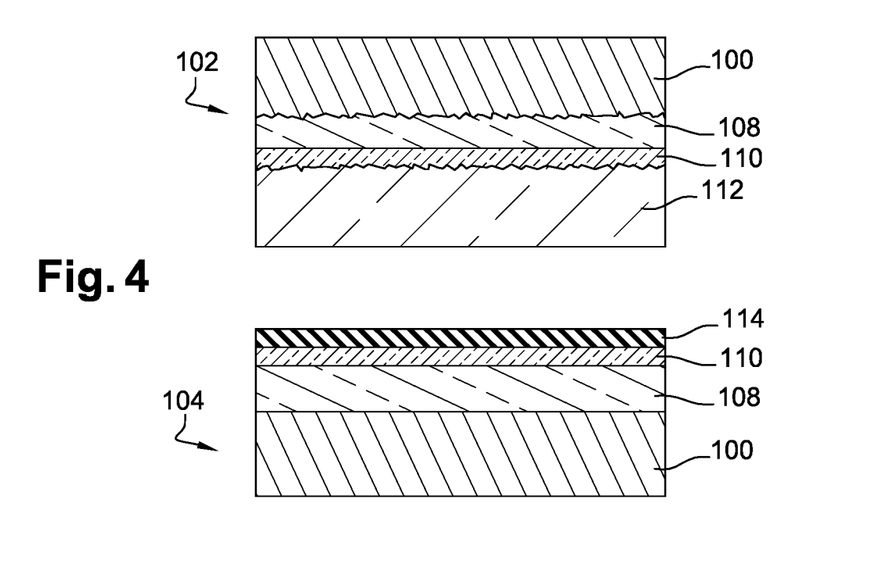
FIG. 4 represents a close-up view of a coated surface of a threaded tube end, in section along the longitudinal axis, in a fourth embodiment in accordance with the invention.

FIG. 4 shows a substrate 100 formed from steel. The substrate 100 is shaped so as to form a female threaded portion 102 and a male threaded portion 104.

The male threaded portion 104 is coated with a metallic anti-corrosion and anti-galling layer 108. The metallic layer 108 has been deposited electrolytically, as described above. The metallic layer 108 is constituted by a binary zinc-nickel (Zn—Ni) alloy and contains zinc (Zn), namely a mean amount of 86.3%. The first metallic layer 108 has a mean thickness of 7.3 μm.

The metallic layer 108 of the male threaded portion 104 is coated with a passivation layer 110, as described above. By definition, the passivation layer has anti-corrosive properties.

Optionally, the passivation layer 110 of the male threaded portion 104 is coated with a barrier layer 114 as described above, which also has anti-corrosive properties.

The substrate 100 of the female threaded portion 102 has a surface roughness. The surface roughness has been obtained by a sand blasting process. In the exemplary embodiment of FIG. 4, the surface roughness (Ra) is approximately 2 μm. In a variation, the sand blasting process may be carried out on the metallic anti-corrosion and anti-galling layer 108 of the female threaded portion 102 described below.

The female threaded portion 102 is coated with a metallic anti-corrosion and anti-galling metallic layer 108. The metallic layer 108 has been deposited electrolytically, as described above. The metallic layer 108 is constituted by a binary zinc-nickel (Zn—Ni) alloy and contains zinc (Zn), namely a mean amount of 86.8%. The metallic layer 108 has a mean thickness of 7.7 μm.

As mentioned above, a sand blasting process may be carried out on the metallic layer 108 of the female threaded portion 102. In one embodiment of the invention, the metallic layer 108 has a surface roughness (Ra) of approximately 2 μm. This means that the passivation layer or the lubricant layer 112 described below can adhere well.

The metallic layer 108 of the female threaded portion 102 is optionally coated with a passivation layer 110, as described above. By definition, the passivation layer has anti-corrosive properties.

The passivation layer 110 of the female threaded portion 102 is coated with a lubricant layer 112. In the embodiment of FIG. 4, the lubricant layer is constituted by epoxy and $MoS_2$.

In a variation, it is possible for there to be no passivation layer 110 and to apply the lubricant layer 112 directly to the metallic layer 108 of the female threaded portion 102 (or directly to the metallic layer 108 of the male threaded portion as appropriate).

Example 5

Figure 5:
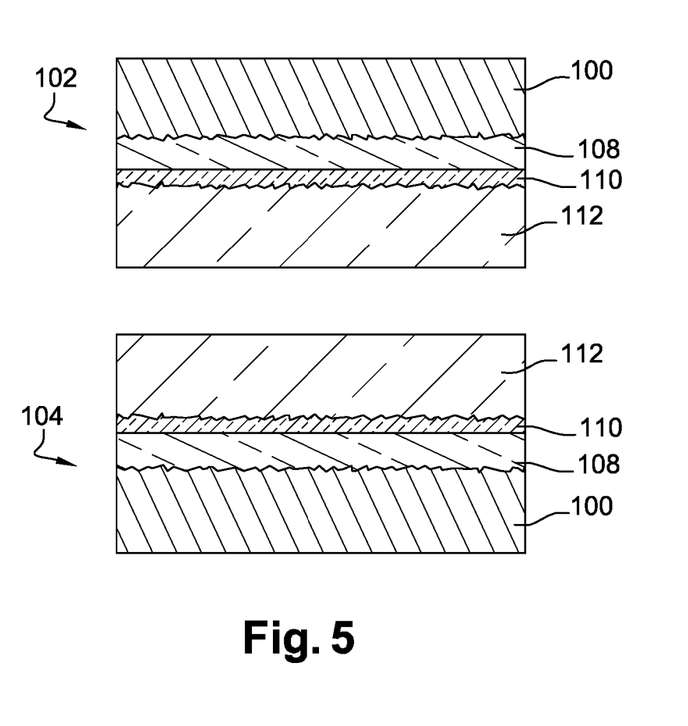
FIG. 5 represents a close-up view of a coated surface of a threaded tube end, in section along the longitudinal axis, in a fifth embodiment in accordance with the invention.

FIG. 5 shows a substrate 100 formed from steel. The substrate 100 is shaped so as to form a female threaded portion 102 and a male threaded portion 104.

The substrate 100 of the male threaded portion 104 has a surface roughness. The surface roughness has been obtained by a sand blasting process. In the exemplary embodiment of FIG. 5, the surface roughness (Ra) is approximately 2 μm. In a variation, the sand blasting process may be carried out on the metallic anti-corrosion and anti-galling layer 108 of the female threaded portion 102 described below.

The male threaded portion 104 is coated with a metallic anti-corrosion and anti-galling layer 108. The metallic layer 108 has been deposited electrolytically, as described above. The metallic layer 108 is constituted by a binary zinc-nickel (Zn—Ni) alloy and contains zinc (Zn), namely a mean amount of 86.7%. The metallic layer 108 has a mean thickness of 7.2 μm.

As mentioned above, a sand blasting process may be carried out on the metallic layer 108 of the male threaded portion 104. In one embodiment of the invention, the metallic layer 108 has a surface roughness (Ra) of approximately 2 μm. This means that the passivation layer or the lubricant layer 112 described below can adhere well.

The metallic layer 108 of the male threaded portion 104 is optionally coated with a passivation layer 110, as described above. By definition, the passivation layer has anti-corrosive properties.

The passivation layer 110 of the male threaded portion 104 is coated with a lubricant layer 112. In the embodiment of FIG. 5, the lubricant layer 112 is constituted by acrylic resin and carbon black.

In a variation, it is possible for there to be no passivation layer 110 and to apply the lubricant layer 112 directly to the metallic layer 108 of the male threaded portion 104.

The substrate 100 of the female threaded portion 102 has a surface roughness. The surface roughness has been obtained by a sand blasting process. In the exemplary embodiment of FIG. 5, the surface roughness (Ra) is approximately 2 µm. In a variation, the sand blasting process may be carried out on the metallic anti-corrosion and anti-galling metallic layer 108 of the female threaded portion 102 described below.

The female threaded portion 102 is coated with a metallic anti-corrosion and anti-galling layer 108. The metallic layer 108 has been deposited electrolytically, as described above. The metallic layer 108 is constituted by a binary zinc-nickel (Zn—Ni) alloy and contains zinc (Zn), namely a mean amount of 86.2% by weight. The metallic layer 108 has a mean thickness of 6.7 µm.

As mentioned above, a sand blasting process may be carried out on the metallic layer 108 of the female threaded portion 102. In one embodiment of the invention, the metallic layer 108 has a surface roughness (Ra) of approximately 2 µm. This means that the passivation layer or the lubricant layer 112 described below can adhere well.

The metallic layer 108 of the female threaded portion 102 is optionally coated with a passivation layer 110, as described above. By definition, the passivation layer has anti-corrosive properties.

The passivation layer 110 of the female threaded portion 102 is coated with a lubricant layer 112. In the embodiment of FIG. 5, the lubricant layer 112 is constituted by an acrylic resin and a dispersion of carbon black in that resin.

In a variation, it is possible for there to be no passivation layer 110 and to apply the lubricant layer 112 directly to the metallic layer 108 of the female threaded portion 102 (or directly to the metallic layer 108 of the male threaded portion, as appropriate).

In particular embodiments, at least some of the layers may extend over other elements of the threaded portion. As an example, when an abutment is present on the threaded portion, the layers may extend over it.

The Applicant has carried out comparative roughness tests between threaded portions before electrolytic deposition of a metallic layer in accordance with the invention and after electrolytic deposition of a metallic layer in accordance with the invention. The roughness was measured in the direction parallel to the direction of machining of said portions. The results are reported in Table 1.

TABLE 1

Comparison of roughness.

| Roughness | | Before electrolytic deposition ZnNi | | | After electrolytic deposition ZnNi | | |
|---|---|---|---|---|---|---|---|
| | | Ra (µm) | Rz (µm) | Rt (µm) | Ra (µm) | Rz (µm) | Rt (µm) |
| No sand blasting | Mean | 0.458 | 2.453 | 2.453 | 0.330 | 2.023 | 4.316 |
| | Std Dev | n.a. | n.a. | n.a. | 0.166 | 0.569 | 3.895 |
| Sand blasting | Mean | 3.254 | 21.243 | 21.243 | 1.495 | 9.918 | 11.561 |
| | Std Dev | 0.171 | 1.271 | 1.271 | 0.166 | 1.127 | 2.060 |

Std Dev = standard deviation
n.a. = not applicable

Ra is the mean deviation roughness—it is the arithmetic mean of the absolute values of the distances between the peaks and valleys measured on the roughness profile. Rz is known as the mean maximum roughness—this is the mean of the maximum heights measured over several (for example 5) selected portions on a roughness profile. Rt is known as the total roughness—this is the maximum height measured over the whole of the roughness profile.

Table 1 shows that the samples of threaded portions after electrolytic deposition have a reduced roughness in the direction parallel to the direction of machining compared with the samples of threaded portions before electrolytic deposition. In particular, the electrolytic deposition in accordance with the invention has a levelling effect.

Figure 6:
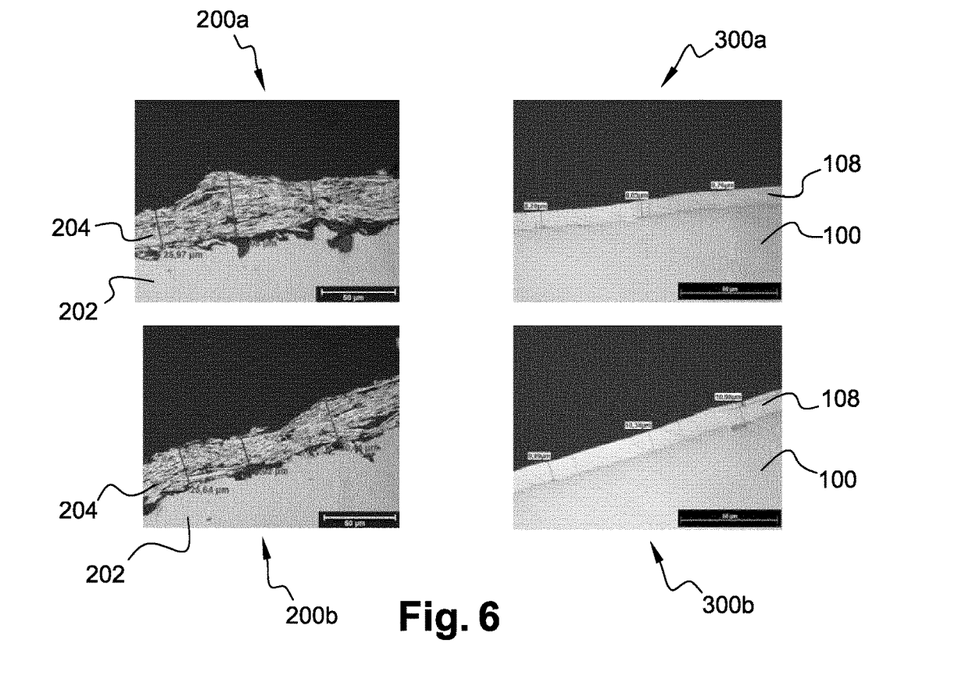
FIG. 6 shows comparative photographs of a threaded element in accordance with the invention and a prior art threaded element.

FIG. 6 shows photographs of threaded elements taken with an optical microscope. More particularly, FIG. 6 shows two selected portions of a prior art threaded element compared with two analogous selected portions of a threaded element in accordance with the invention.

The microscope used was optical. The magnification was: ×500. The scale indicated on each photograph is 50 µm.

The prior art threaded element is shown in photographs 200a and 200b. The prior art substrate 202 formed from steel is coated with a layer 204 comprising particles of lamellar zinc dispersed in an epoxy resin. The layer 204 was applied using a process which is known in the art. The prior art process comprises pneumatic spraying of the layer 204 onto the substrate 202 at ambient temperature, followed by hot curing of the substrate/layer ensemble. During the spraying phase, the composition of the layer 204 comprises a solvent. The curing phase is used to eliminate the solvent and cross-link the layer 204. The photographs 200a and 200b show that the layer 204 is heterogeneous. In fact, the layer 204 of the prior art threaded element has a non-uniform microstructure.

The threaded element of the invention is shown in photographs 300a and 300b. The substrate 100 is coated with a first metallic layer 108 constituted by a binary Zn—Ni alloy of the type described in Example 1 above. The binary alloy was applied electrolytically in order to form a homogeneous layer. In fact, photographs 300a and 300b of FIG. 6 show that the first metallic layer 108 of the threaded element of the invention has a uniform microstructure. In the present case, it is a monophase gamma (γ) type microstructure.

Figure 7:
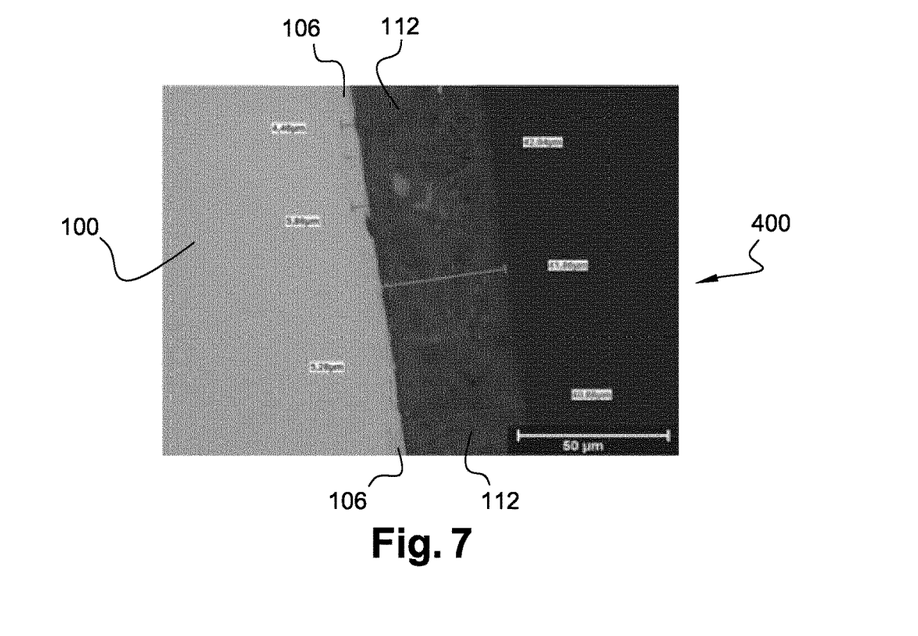
FIG. 7 shows a photograph of a threaded element in accordance with an embodiment of the invention.

FIG. 7 shows a photograph 400 of a threaded element in accordance with the invention taken with an optical microscope. The magnification is: ×500. The scale indicated on each photograph is 50 µm.

The substrate 100 was coated with a second metallic layer 106 constituted by a binary Zn—Ni alloy of the type described in Example 1 above. The binary alloy was applied electrolytically in order to form a homogeneous layer. The metallic layer had a thickness of approximately 4 µm to approximately 6 µm (mean thickness approximately 5 µm). The metallic layer was coated with a lubricant layer 112 of the hot-melt HMS-3 type, as described in Example 1. The lubricant layer has a thickness of approximately 40 µm to approximately 43 µm.

The second metallic layer 106 has a uniform microstructure. In fact, the second metallic layer constituted by a binary Zn—Ni alloy also has a monophase gamma (γ) type microstructure.

FIGS. 6 and 7 thus demonstrate that the metallic layer of the invention has a uniform microstructure.

The elements of the tubes of the invention, namely the male or female threaded portions as well as the connections produced with these portions, comply with the conditions of international standard API RP 5C5 (3$^{rd}$ Edition, July 2003). In particular, the tube elements resisted 15 makeup/breakout procedures and fully satisfied the sealing conditions.

The elements of the tubes of the invention, namely the male or female threaded portions as well as the connections produced with these portions, were in full compliance with the conditions of European standard NF EN ISO 9227 relating to saline mist tests. In particular, the tube elements responded positively as regards corrosion resistance over 1000 h of exposure to an aggressive environment.

The invention claimed is:

1. A threaded portion of a tubular element for a threaded tubular connection having an axis of revolution, said portion comprising a threading extending over its outer or inner peripheral surface, and a first sealing surface on said peripheral surface, said first sealing surface being capable of producing metal-metal interference with a corresponding second sealing surface belonging to a complementary threaded portion, wherein said threading and said first sealing surface are coated with an electrolytically deposited metallic anti-corrosion and anti-galling layer wherein zinc (Zn) is the major element by weight, said electrolytically deposited metallic anti-corrosion and anti-galling layer being at least partially coated with a lubricant layer comprising a resin and a dry solid lubricant powder dispersed in said resin.

2. The threaded portion according to claim 1, wherein the electrolytically deposited metallic anti-corrosion and anti-galling layer comprises at least 50% by weight of zinc (Zn).

3. The threaded portion according to claim 1, wherein the electrolytically deposited metallic anti-corrosion and anti-galling layer has a thickness in the range 4 μm to 20 μm.

4. The threaded portion according to claim 1, wherein the lubricant layer has a thickness in the range 5 μm to 50 μm.

5. The threaded portion according to claim 1, wherein the electrolytically deposited metallic anti-corrosion and anti-galling layer comprises a substance selected from the group consisting of pure zinc (Zn) and a binary alloy of zinc (Zn) of the type Zn—X, in which X is selected from nickel (Ni), iron (Fe), magnesium (Mg) and manganese (Mn).

6. The threaded portion according to claim 1, wherein the electrolytically deposited metallic anti-corrosion and anti-galling layer is a binary zinc-nickel (Zn—Ni) alloy wherein the nickel (Ni) content is in a range of from 12% to 15% by weight and wherein the microstructure is monophase and in the gamma (γ) phase.

7. The threaded portion according to claim 1, further comprising a passivation layer comprising trivalent chromium (Cr(III)), said passivation layer being between the metallic anti-galling layer and the lubricant layer.

8. The threaded portion according to claim 1, wherein said dry solid lubricant powder is selected from the group consisting of polytetrafluoroethylenes (PTFE), molybdenum dithiocarbamates (MoDTC), molybdenum disulphides (MoS$_2$), carbon blacks (C), graphite fluorides (CF$_x$) and any mixture thereof.

9. The threaded portion according to claim 1, wherein said resin is selected from the group consisting of polyvinyl resins, epoxy resins, acrylic resins, polyurethane resins and polyamide-imide resins.

10. The threaded portion according to claim 1, wherein the resin is an acrylic resin and the dry solid lubricant powder comprises 3% to 15% of carbon blacks, molybdenum disulphides (MoS$_2$) or molybdenum dithiocarbamates (MoDTC), used alone or as a combination.

11. The threaded portion according to claim 1, wherein said portion further comprises a first abutment which is capable of coming into contact with a corresponding second abutment, at the end of makeup, belonging to a complementary threaded tube portion.

12. The threaded portion according to claim 1, wherein said portion comprises steel.

13. The threaded portion according to claim 1, wherein said portion is male in type, with a threading extending over its outer peripheral surface as well as a first sealing surface on said outer peripheral surface.

14. The threaded portion according to claim 1, wherein said portion is female in type, with a threading extending over its inner peripheral surface as well as a first sealing surface on said inner peripheral surface.

* * * * *